(12) United States Patent
Walker, Jr.

(10) Patent No.: US 7,223,028 B2
(45) Date of Patent: May 29, 2007

(54) OPTICAL BARRELS WITH ELECTROMAGNETIC SHIELDING

(75) Inventor: Harold Young Walker, Jr., Plano, TX (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/222,531

(22) Filed: Sep. 9, 2005

(65) Prior Publication Data
US 2006/0051031 A1    Mar. 9, 2006

Related U.S. Application Data

(60) Provisional application No. 60/608,318, filed on Sep. 9, 2004.

(51) Int. Cl.
*G02B 6/36* (2006.01)
(52) U.S. Cl. ............................. 385/92; 385/88; 385/94
(58) Field of Classification Search ............ 385/88–94, 385/49
See application file for complete search history.

(56) References Cited

U.S. PATENT DOCUMENTS

| | | | |
|---|---|---|---|
| 6,206,582 B1 * | 3/2001 | Gilliland ...................... 385/92 |
| 6,663,296 B1 * | 12/2003 | Blair et al. ................... 385/92 |
| 6,953,289 B2 * | 10/2005 | Togami et al. ................ 385/92 |
| 6,966,705 B2 * | 11/2005 | Sato et al. .................... 385/88 |
| 2002/0146208 A1 * | 10/2002 | Nakura et al. ................ 385/53 |
| 2005/0244109 A1 * | 11/2005 | Yabe et al. .................... 385/92 |
| 2006/0045436 A1 * | 3/2006 | Wang et al. ................... 385/92 |

* cited by examiner

*Primary Examiner*—Hemang Sanghavi
(74) *Attorney, Agent, or Firm*—Workman Nydegger

(57) ABSTRACT

Reducing transmission of electromagnetic waves through a barrel portion of an optical module. A barrel for optically coupling an optical device to an optical fiber within a fiber optic cable can include a plastic portion and a metallic shielding portion for reducing transmission through the barrel. An optical device can be coupled to the plastic portion. The metallic shielding portion can be coupled to the plastic portion and surround at least a portion of the plastic portion. The metallic shielding portion can be shaped and configured so as to reduce transmission of electromagnetic radiation through the barrel.

25 Claims, 3 Drawing Sheets

OPTICAL BARRELS WITH ELECTROMAGNETIC SHIELDING

CROSS-REFERENCE TO RELATED APPLICATIONS

This application claims the benefit of U.S. Provisional Patent Application No. 60/608,318 entitled "Metallic Barrel Laser Transmitter Header with Integrated Lens" filed Sep. 9, 2004, which is hereby expressly incorporated by reference herein.

BACKGROUND OF THE INVENTION

1. The Field of the Invention

Embodiments of the invention relate to improving fiber optic integrity within an optical component. More particularly, embodiments of the invention relate to optical devices that provide electromagnetic shielding.

2. The Relevant Technology

Fiber optic technology is increasingly employed in the transmission of data over communications networks. Networks employing fiber optic technology are known as optical communications networks, and are typically characterized by high bandwidth and reliable, high-speed data transmission.

To communicate over an optical communications network using fiber optic technology, fiber optic components such as fiber optic transceivers are used to send and receive optical data. Generally, a fiber optic transceiver includes optical subassemblies ("OSA") such as a transmit optical subassembly ("TOSA") for sending optical signals, and a receive optical subassembly ("ROSA") for receiving optical signals.

More particularly, the TOSA receives an electrical data signal and converts the electrical data signal into an optical data signal for transmission onto an optical network. The ROSA receives an optical data signal from the optical network and converts the received optical data signal to an electrical data signal for further use and/or processing. Both the ROSA and the TOSA include specific optical components for performing such functions.

A conventional TOSA includes an optical transmitter such as a light emitting diode (LED) or a laser diode. The optical transmitter generates an optical signal that is launched onto an optical fiber. A plastic barrel is typically used to align and couple the optical signal emission from the optical transmitter with the end of a fiber optic cable for transmission of the optical signal to a fiber optic network. The optical transmitter can be located within a header, such as a TO-Can package, and is typically covered by an at least partially transparent cap (or lid) that protects the optical transmitter and allows the optical transmitter to transmit the optical data signal to an optical fiber. The cap may include a lens for focusing the optical signal transmission.

A conventional ROSA includes an optical receiver, such as a PIN photodiode or avalanche photodiode ("APD"). A plastic barrel is typically used to align and couple the end of a fiber optic cable relative to the optical receiver. This facilitates transmission of the optical signal to the optical receiver. The optical receiver can be covered by a partially transparent cap that protects the optical receiver and allows the optical receiver to receive the optical data signal from the optical cable. The cap may also include a lens for focusing the optical signal transmission.

A typical optical fiber has a core of high refractive index material surrounded by a low-index cladding material. In order for an optical transmitter to transmit an optical signal to an optical fiber, the optical emission of the optical transmitter is aligned with the transmissive core of the optical fiber such that the core of the optical fiber receives a sufficient portion of the emission from the optical transmitter. Likewise, in order for an optical receiver to receive an optical signal from an optical fiber, the active surface of the optical receiver is aligned with the transmissive core of the optical fiber such that a sufficient portion of the optical signal is received by the optical receiver from the optical fiber.

Referring to FIG. 1, a conventional module 100 for coupling an optical device 101 to a fiber optic cable 102 is shown. As shown in FIG. 1, the module 100 has a plastic barrel 103 with an open end 104 that is sized and configured to receive a fiber optic end face 105 of the fiber optic cable 102 in alignment with the optical device 101 mounted on a header 106.

In the case of a ROSA, the optical device 101 includes an optical receiver for receiving an optical signal from the optical fiber 102 and converting the optical signal to an electronic signal. In the case of a TOSA, the optical device 101 includes an optical transmitter for receiving an electronic signal, converting the electronic signal to an optical signal, and transmitting the optical signal to the optical fiber 102. The header 106 has electrical leads 107, sometimes referred to as feed throughs, for providing power and data signals between an OSA printed circuit board ("PCB") (not shown) and any optical device(s) mounted on the header 106.

A cap 108 covers the optical device 101 mounted on the header 106 for protection of the optical device 101. The cap 106 can be made of an at least partially transparent plastic material, and may include a focusing lens or transmission window for allowing optical signals to travel to or from the optical device 101.

While the header 106 is partially fabricated with metal and provides some electromagnetic shielding, the electro magnetic shielding provided by both the header 106 and the plastic barrel 103 can be insufficient. In some instances, electromagnetic radiation 109A originating from inside the module 100 can be transmitted through the plastic barrel 103 and to the outside of the module. Similarly, electromagnetic radiation 109B may travel from the outside of the module 100 and through the plastic barrel 103 entering into the inside of the barrel causing interference. Such interference can disrupt communication, especially in compact products and products transferring data at high rates where the highest level of attenuation is desirable.

Therefore, what would be advantageous are optical components having additional electromagnetic shielding, thereby reducing, if not eliminating, the adverse effects of electromagnetic radiation on the reception or transmission of optical signals.

SUMMARY OF THE INVENTION

The present invention relates to reducing transmission of electromagnetic waves through a barrel portion of an optical module. A barrel for optically coupling an optical device to an optical fiber within a fiber optic cable is described. The barrel can include a plastic portion. The barrel can further include an optical device coupled to the plastic portion. The barrel can further include a metallic shielding portion coupled to the plastic portion. The metallic shielding portion can surround at least a portion of the plastic portion. The metallic shielding portion can be shaped and configured so as to reduce transmission of electromagnetic radiation through the barrel.

A module for coupling an active optical device to a fiber optic cable is described. The module can include a barrel for optically coupling an active optical device to a fiber optic cable. The barrel can include a plastic portion configured to receive an active optical device. The barrel can further include a metallic shielding portion made of a metallic material attached to the plastic portion and surrounding at least a portion of the plastic portion. The shielding portion can be shaped and configured so as to reduce electromagnetic transmission to the interior of the barrel. The module can further include an optical device mounted on a header. The header can be coupled to the plastic portion. The active optical device can be in optical alignment with an alignment portion of the barrel so as to be in optical communication with a fiber optical endface of the optical cable received by the alignment portion.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention are described with reference to the attached drawings to illustrate the structure and operation of example embodiments used to implement the present invention. Using the diagrams and description in this manner to present the invention should not be construed as limiting its scope. Additional features and advantages of the invention will in part be obvious from the description, including the claims, or may be learned by the practice of the invention.

The present invention relates to providing electromagnetic shielding for optical components within optical modules. Electromagnetic radiation is made up of oscillating electric and magnetic fields. Electromagnetic radiation includes gamma radiation, X-rays, ultraviolet, visible and infrared radiation, radar and radio waves. Electromagnetic radiation can cause various problems with optical modules. Optical modules can include active optical devices, such as optical receivers and optical transmitters, as well as various passive optical devices. Electromagnetic radiation entering and/or leaving an optical module can cause interference, violate industry standards, or have other undesirable effects. Undesired electromagnetic radiation interference can cause the optical module to perform poorly.

One type of optical module or component is an optical barrel. An optical barrel receives an optical fiber of an optical cable and aligns the endface of the optical fiber with an optical device, such as an active optical device or a passive optical device for communication of an optical signal. As described previously, electromagnetic interference can interfere with the communication of the optical signals between the endface of the optical fiber and the active or passive optical device(s). Electromagnetic radiation leaving the barrel can also cause interference or other problems with other components outside of the optical barrel.

In some instances multiple optical devices may be located within the barrel. For example, a laser may be optically coupled to a monitor photodiode for monitoring the output of the laser and for providing feedback to a laser driver located outside, or within, a package encasing the laser and monitor photodiode. Thus, electronic radiation transmitted through the barrel can cause interference with any of these devices.

Figure 1:
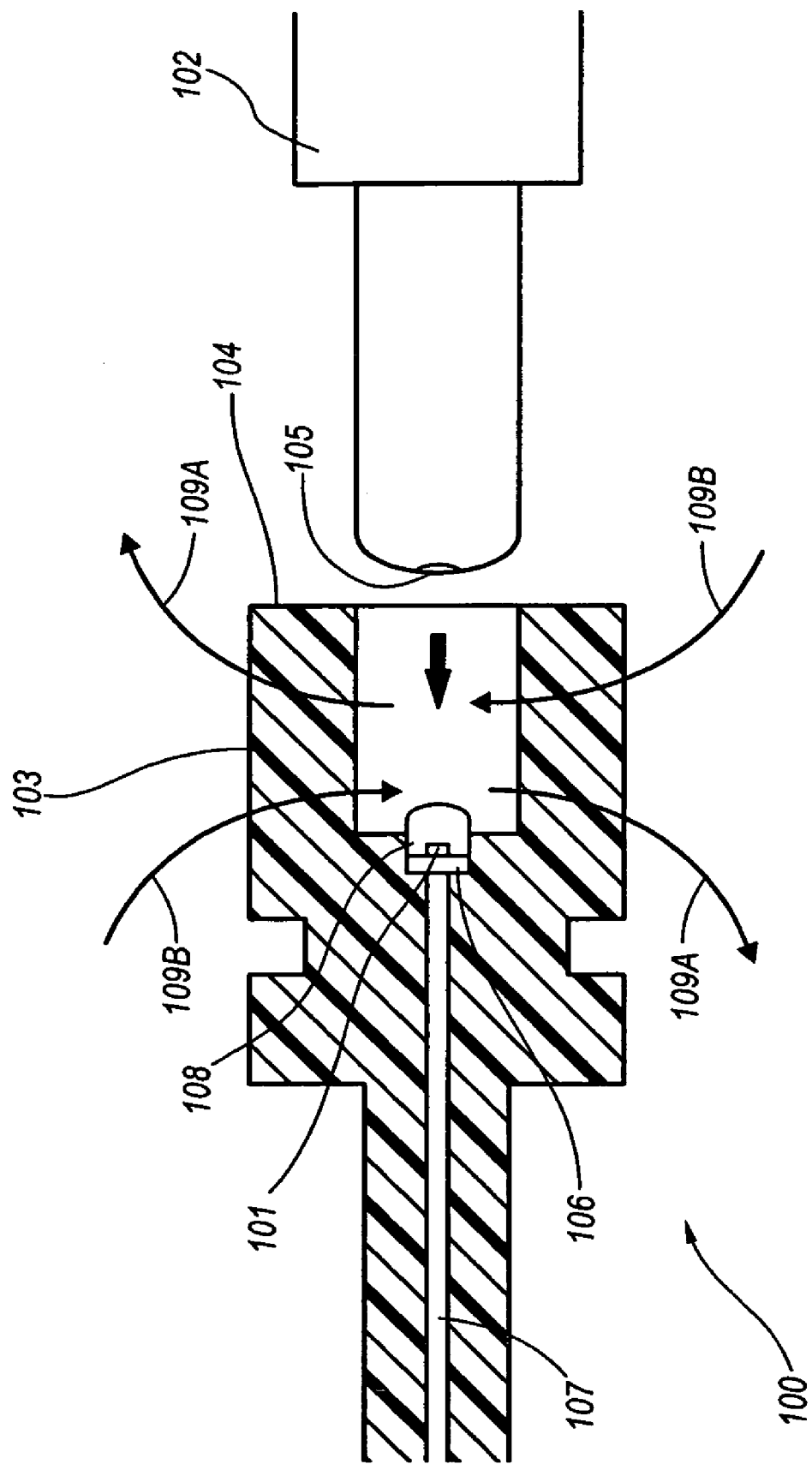
FIG. 1 illustrates a typical module for coupling an active optical device to a fiber optic cable.
Figure 2:
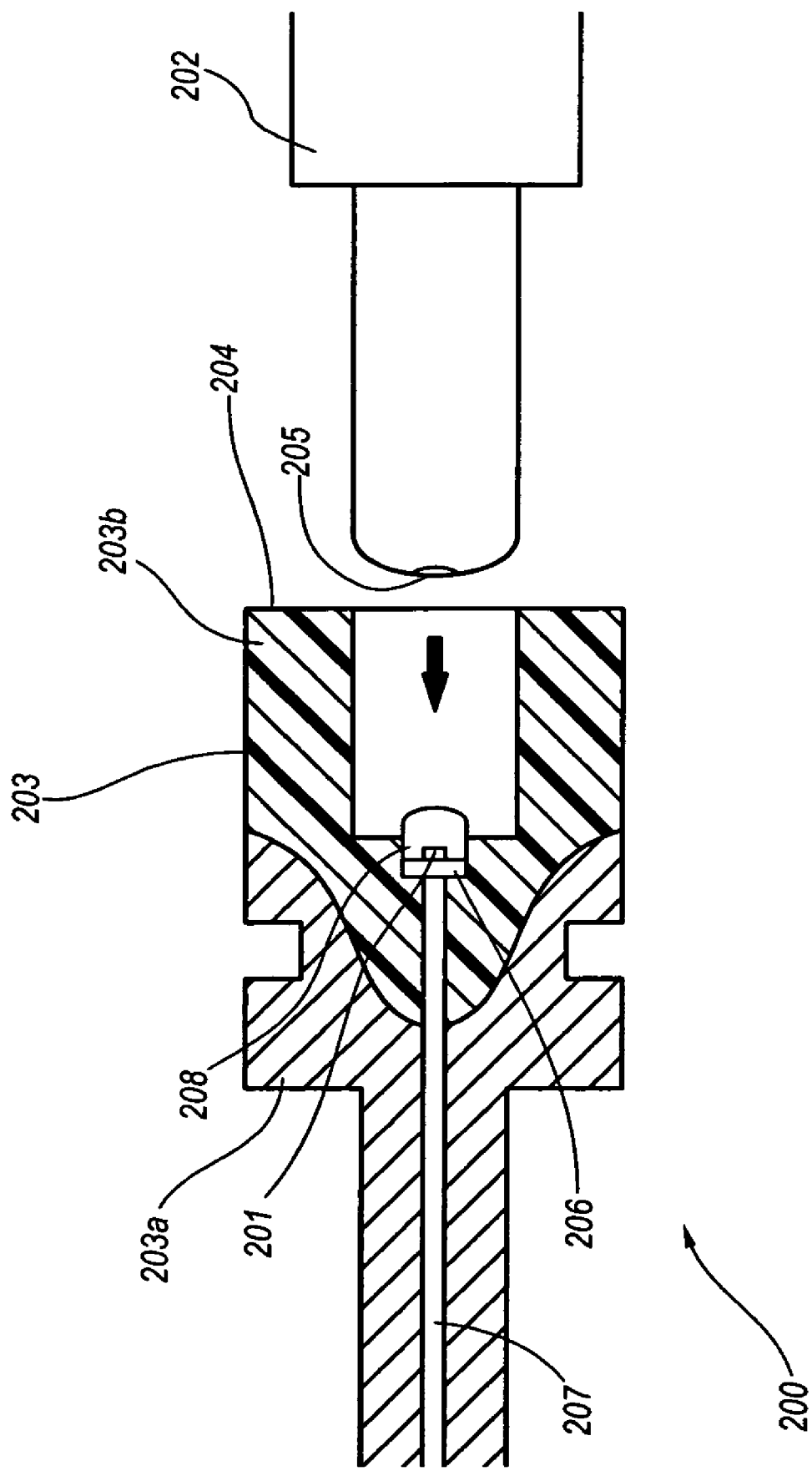
FIG. 2 illustrates one embodiment of a module for coupling an active optical device, such as a laser or photodiode, to a fiber optic cable.

FIG. 2 illustrates a module 200 for coupling an optical device 201, such as a laser or photodiode, to a fiber optic cable 202 according to one example embodiment. As shown in FIG. 2, the module 200 can include a barrel 203 having two portions made of different materials. The barrel 203 can include a metal shielding portion 203a and a plastic alignment portion 203b. The plastic alignment portion 203b can have an open end 204 that is sized and configured to receive the end face 205 of a fiber optic cable 202 such that the end face 205 of the fiber optic cable 202 will be in alignment with the optical device 201, (e.g. a laser, such as a vertical cavity surface emitting laser ("VCSEL"), or a photodiode) mounted on a header 206, which can be part of a TO-Can package.

In the case of a ROSA, the optical device 201 includes an optical receiver, such as a photo diode, mounted on the surface of the header 206 for receiving a signal from the fiber optic end face 205. In the case of a TOSA, the optical device 201 includes an optic transmitter, such as a VCSEL, mounted on the surface of the header 201 for transmitting a signal to the fiber optic end face 205. The header 206 can be connected to a plurality of electrical leads 207, sometimes referred to as feed throughs, for providing power and data transmission between an optical subassembly ("OSA") printed circuit board ("PCB") and the optical device 301 mounted on the header 206.

A cap 208 can cover the optical device 301 mounted on the header 206 for protection of the optical device 301. The cap 208 can be made of an at least partially transparent plastic material, and may include a focusing lens or transmission window for allowing optical signals to travel to and from the optical device 301.

The metal shielding portion 203a can be made of a metal providing for electromagnetic shielding of the interior of the barrel 203, thereby reducing, or eliminating, transmission of electromagnetic signals into or out of the plastic alignment portion 203b. The plastic alignment portion 203b can be attached to the metal shielding portion 203a by an adhesive, glue, epoxy, a snap-fit engagement, welding, or by some other means of attaching the plastic alignment portion 203b to the metal shielding portion 203a. The plastic alignment portion 203b can be attached to the metal shielding portion using a method of attachment that provides a ridged and secure attachment.

While the metal shielding portion 203a is shown in FIG. 2 to provide shielding just past the location of the optical device 201, it should be appreciated that the relative proportions and length of the metal shielding portion 203a may be varied. For example, the metal shielding portion 203a may extend all the way to the open end 204 of the plastic aligning portion 203b, or any distance in between while still allowing the plastic aligning portion 203b to engage the fiber optic cable 202 upon insertion of the fiber optic end face 205 into the open end 204 of the plastic aligning portion 203b. The metal shielding portion 203a can also be smaller for preventing transmission through only the rear portion of the barrel 203.

The metal shielding portion 203a can be shaped such that the plastic aligning portion 203b is aligned when it is received by an open end of the metal shielding portion. For example, as shown in FIG. 2, the metal shielding portion 203a can have an open end 210 for receiving the plastic aligning portion 203b. The open end can be curved such that when it receives a complementary shaped portion of the aligning portion 203b the aligning portion 203b is mechanically aligned with the open end 210 of the metal shielding portion 203a. The engaging surfaces can also be substantially straight, but will not have the self aligning features of the embodiment illustrated in FIG. 2.

Figure 3:
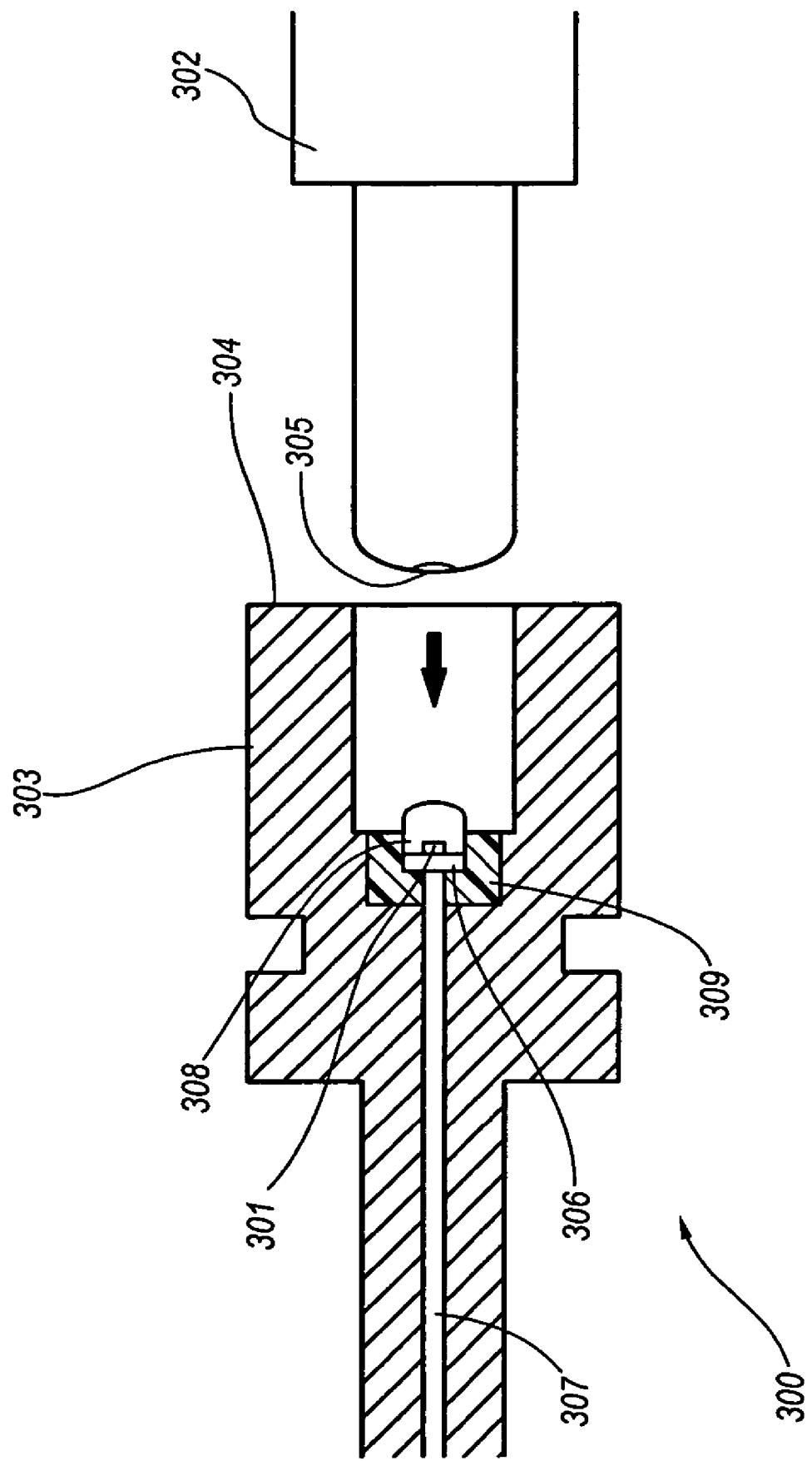
FIG. 3 illustrates one embodiment of a module for coupling an active optical device, such as a laser or photodiode, to a fiber optic cable.

Referring now to FIG. 3, a module 300 for coupling an optical device 301 to a fiber optic end face 305 of a fiber optic cable 302 is illustrated according to another example embodiment. The module 300 in FIG. 3 includes a metal barrel 303. The metal barrel 303 has an open end 304 that is sized and configured to receive a fiber optic end face 305 of a fiber optic cable 302 in alignment with an optical device 301 mounted on a header 306, which can be part of a TO-Can package. The module 300 includes a TOSA or a ROSA. For example, the optical device 301 can be part of an OSA and can include an optical receiver and/or an optical transmitter.

The header 306 can be attached to a plastic insert 309 and the plastic insert 309 can be received within the open end 304 of the metal barrel 303 such as is shown in FIG. 3. The plastic insert 309 can provide a means for mounting the optical device 301 within the metal barrel 303 without requiring that the optical device 301 come in direct contact with the metal barrel 303. A cap 308 can cover the optical device 301 mounted on the header 306 for protection of the optical device 301. The cap 308 can be made of a transparent plastic material, and may include a focusing lens or transmission window for allowing optical signals to travel to and from the optical device 301. The plastic insert 309 can be attached to the interior of the metal barrel 303 using an adhesive, glue, epoxy, a snap-fit engagement, welding, or some other means of attaching the plastic insert 309 inside the open end 304 of the metal barrel 303. The engaging walls of the metal barrel 303 and the plastic insert 309 can be curved similar to that shown in FIG. 2 for self aligning purposes as discussed above with reference to FIG. 2.

The metal barrel 303 provides electromagnetic shielding for the interior of the barrel 303 thereby reducing, if not eliminating, the transmission of electromagnetic signals into or out of the interior of the barrel 303.

According to the above embodiments additional electromagnetic shielding can be provided, while retaining many, if not all, of the benefits of a traditional component having a plastic barrel without the additional electromagnetic shielding.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A barrel for optically coupling an optical device to an optical fiber within a fiber optic cable, the barrel comprising:
   a first end configured to receive an optical fiber;
   a second end opposite to the first end;
   a plastic portion;
   an optical device coupled to the plastic portion; and
   a metallic shielding portion coupled to the plastic portion, the metallic shielding portion surrounding at least a portion of the plastic portion and extending past the optical device toward the second end of the barrel, wherein the metallic shielding portion is shaped and configured so as to reduce transmission of electromagnetic radiation through the barrel.

2. A barrel according to claim 1, further comprising:
   an at least partially transparent cap covering the optical device.

3. A barrel according to claim 1, wherein the optical device comprises an active optical device.

4. A barrel according to claim 1, wherein the optical device comprises an optical transmitter.

5. A barrel according to claim 1, wherein the optical device comprises a laser.

6. A barrel according to claim 1, wherein the optical device comprises a vertical cavity surface emitting laser (VCSEL).

7. A barrel according to claim 1, wherein the optical device comprises an optical receiver.

8. A barrel according to claim 1, wherein the optical device comprises a photodiode.

9. A barrel according to claim 1, wherein the plastic portion comprises a plastic alignment portion for receiving an optical cable and optically aligning an endface of the optical cable with the optical device, wherein the metal shielding portion surrounds an outer portion of the plastic alignment portion.

10. A barrel according to claim 1, wherein:
    the metallic portion comprises a metallic alignment portion for engaging and receiving an optical cable; and
    the plastic portion comprises a plastic insert that is received within the metallic portion, wherein the plastic portion is configured to receive the optical device.

11. A barrel according to claim 10, further comprising:
    a header coupled to the optical device; and
    electrical leads coupled to the header for providing electrical power to the optical device, wherein the plastic insert encases at least a portion of the header and at least a portion of the electrical leads.

12. A barrel according to claim 11, wherein the optical device and header are part of a TO-Can package.

13. A barrel according to claim 1, further comprising:
    a header coupled to the optical device; and
    electrical leads coupled to the header for providing electrical power to the optical device, wherein the header is surrounded by the metallic shielding portion.

14. A barrel according to claim 13, wherein the optical device and header are part of a TO-Can package.

15. A barrel according to claim 1, wherein the metallic shielding portion extends to the second end of the barrel.

16. A barrel according to claim 15, wherein the metallic shielding portion extends around at least a portion of the second end of the barrel.

17. A module for coupling an active optical device to a fiber optic cable, the module comprising:
   a barrel for optically coupling an active optical device to a fiber optic cable, the barrel comprising:
      a plastic portion coupled to an active optical device; and
      a metallic shielding portion attached to the plastic portion and surrounding at least a portion of the plastic portion, the shielding portion being shaped and configured so as to reduce electromagnetic transmission to the interior of the barrel; and
   an active optical device mounted on a header, the header being coupled to the plastic portion, wherein the active optical device is in optical alignment with an alignment portion of the barrel so as to be optically coupled with a fiber optical endface of the optical cable received by the alignment portion, wherein the metallic shielding surrounds at least a portion of the header.

18. A module according to claim 17, wherein the plastic portion comprises an alignment portion for receiving the fiber optical cable in optical alignment with the active optical device.

19. A module according to claim 17, wherein the metallic shielding portion includes an alignment portion for engaging and receiving the fiber optic cable in optical alignment with the active optical device, and wherein the plastic portion includes a plastic insert within an open end of the metallic shielding portion, wherein the active optical device is received within the plastic insert.

20. A module according to claim 17, wherein the active optical device comprises an optical transmitter.

21. A module according to claim 17, wherein the active optical device comprises a vertical cavity surface emitting laser (VCSEL), a laser, or a light emitting diode (LED).

22. A module according to claim 17, wherein the active optical device comprises an optical receiver.

23. A module according to claim 17, wherein the active optical device comprises a photodiode.

24. A module according to claim 17, wherein the shielding portion is attached to the alignment portion using adhesive, glue, epoxy, a snap-fit engagement, or welding.

25. A module according to claim 17, further comprising an at least partially transparent cap covering the active optical device.

* * * * *

UNITED STATES PATENT AND TRADEMARK OFFICE
CERTIFICATE OF CORRECTION

PATENT NO. : 7,223,028 B2
APPLICATION NO. : 11/222531
DATED : May 29, 2007
INVENTOR(S) : Walker, Jr.

It is certified that error appears in the above-identified patent and that said Letters Patent is hereby corrected as shown below:

Column 5
Line 22, remove [210]
Line 26, remove [210]

Signed and Sealed this

Thirtieth Day of March, 2010

David J. Kappos
*Director of the United States Patent and Trademark Office*